United States Patent [19]
Eisen et al.

[11] Patent Number: 5,307,498
[45] Date of Patent: Apr. 26, 1994

[54] AUTOMATED METHOD FOR ADDING HOOKS TO SOFTWARE

[75] Inventors: Ivan R. Eisen, Flower Mound; Stephen W. Murphrey, Highland Village, both of Tex.; Don Zagorski, Kent, Wash.

[73] Assignee: International Business Machines Corporation, Armonk, N.Y.

[21] Appl. No.: 986,165

[22] Filed: Dec. 4, 1992

[51] Int. Cl.⁵ .............................................. G06F 9/00
[52] U.S. Cl. ............................ 395/700; 364/DIG. 1; 364/286
[58] Field of Search ........................................ 395/700

[56] References Cited
PUBLICATIONS

Bishop, D. A. DekoVert I Program for Systrace Type Hooks. IBM TDB, No. 7A, Dec. 1991, pp. 171-173.
Clark, D. K., et al. Useability Measuring Tool. IBM TDB, No. 5, Oct. 1991, pp. 284-285.
Athwal, D. S., et al. Hook Handler. IBM TDB, Jul., 1988, pp. 126-127.
Gottlieb, A. M., et al. General-Purpose Software Monitor Architecture. IBM TDB, Apr. 1988, pp. 85-87.
Weiss, L. Patch Microcode Change Level Check. IBM TDB, Mar. 1984, pp. 5606-5607.
Hoernes, G. E. Extracting Descriptive Information from Procedures. IBM TDB, Oct. 1981, pp. 2340-2343.
Winters, R. M. Round Robin Hooking Technique. IBM TDB, Mar. 1975, p. 2831.
Attanasio, C. R., et al. Performance Evaluator for Operating System. IBM TDB, Jun. 1973, pp. 110-118.

*Primary Examiner*—Gareth D. Shaw
*Assistant Examiner*—A. Katbab
*Attorney, Agent, or Firm*—A. Bruce Clay; Jonathan E. Jobe

[57] ABSTRACT

The automatic addition of hooks to software is provided by greatly simplified steps. A function which is to be hooked is renamed. A new function is then created utilizing the original function name to call the renamed function. The new function is provided with a hook entry and exit.

2 Claims, 4 Drawing Sheets

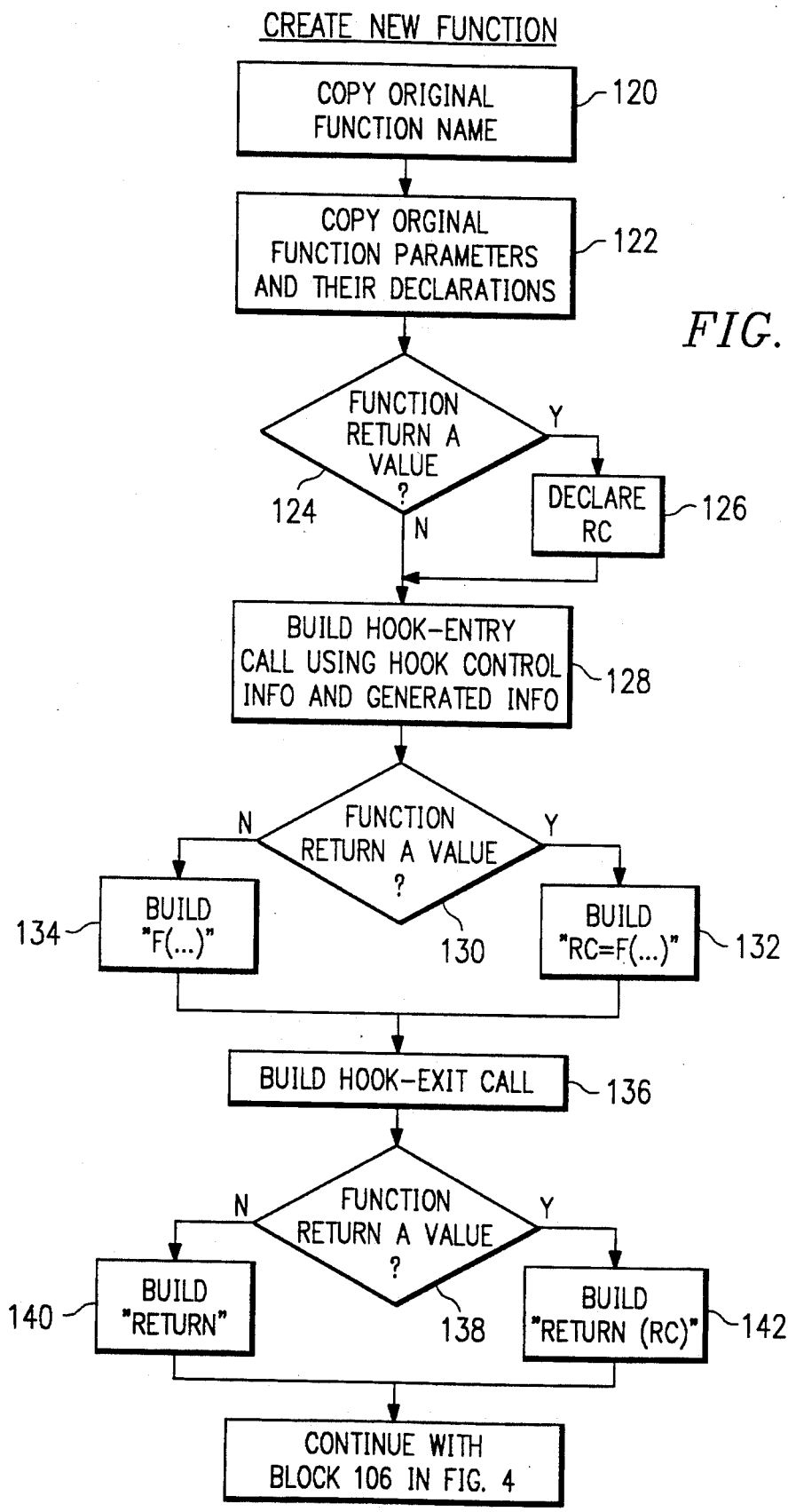

AUTOMATED METHOD FOR ADDING HOOKS TO SOFTWARE

TECHNICAL FIELD OF THE INVENTION

The present invention relates in general to computer software, and in particular to an automated method and apparatus for adding hooks to software.

BACKGROUND OF THE INVENTION

Hooks are special code used in software programming to "capture" information from the program on such things as performance data, RAS (Reliability, Availability, and Service) data, or execution tracing data. Once hooks are added to a program, output data resulting therefrom can be analyzed at a later time. The process of manually adding programming hooks can be error-prone and extremely time-consuming under the prior art. To add hooks to a program, the programmer may perform multiple steps. First, the programmer determines what code needs to be called by hooks. The programmer then edits the source code with a text editor, locating code that needs to be hooked sequentially. As the code for hooking is located, the programmer adds a hook code to the source file. Upon completion of adding a hook code, the programmer saves the updated source file, and the updated code is then compiled and linked.

In addition, the insertion of a hook may require the insertion of a hook exit as well. With the complexity of code that contains multiple exits points, it is very possible that a program will branch off to another portion of the program without coming to the hook exit. In addition, return statements in many languages can be complex and contain logic that may be skipped if a hook were placed in front of them. Thus, erroneous information may be produced. In addition, any time the programmer changes the code, it may be necessary to redo the hooks. It may also be necessary, in some cases, to rewrite the return statements, which may be time-consuming and frustrating. Thus, there is a need for a method for automating the addition of hooks to software.

SUMMARY OF THE INVENTION

The present invention provides an automated method of adding hooks to software which eliminates or substantially reduces the problems of manual procedures of the prior art. The present invention is both fast and simple to use, and may eliminate the necessity for a programmer to insert the hooks manually.

In accordance with one aspect of the present invention, a method of adding hooks to a computer program is provided. A function which is to be hooked in the program is renamed from a first name to a second name. A new hooking function is then added to the program. As used herein, a function is meant to generically describe a program unit that is invoked by its name or one of its entry names. Dependent upon the language being used, a function may be, for example, a method, a procedure, a CSECT, a subroutine, etc. The new function is given the same name as the original function and is provided with a hook entry and exit. The new function calls the renamed function and allows the production of hook output data as required.

It is a technical advantage of the present invention that hooks can be automatically added to software. It is a further advantage of the present invention that the need for a programmer to add hooks may be eliminated. Due to the present invention, a test group can now work independently of a development group when there is a need to install hooks.

BRIEF DESCRIPTION OF THE DRAWINGS

For a more complete understanding of the present invention and the advantages thereof, reference is now made to the Detailed Description taken in conjunction with the attached Drawings, in which:

FIG. 5 is a detailed illustration of the 'Create New Function' as shown in FIG. 4.

DETAILED DESCRIPTION OF THE INVENTION

Figure 1:
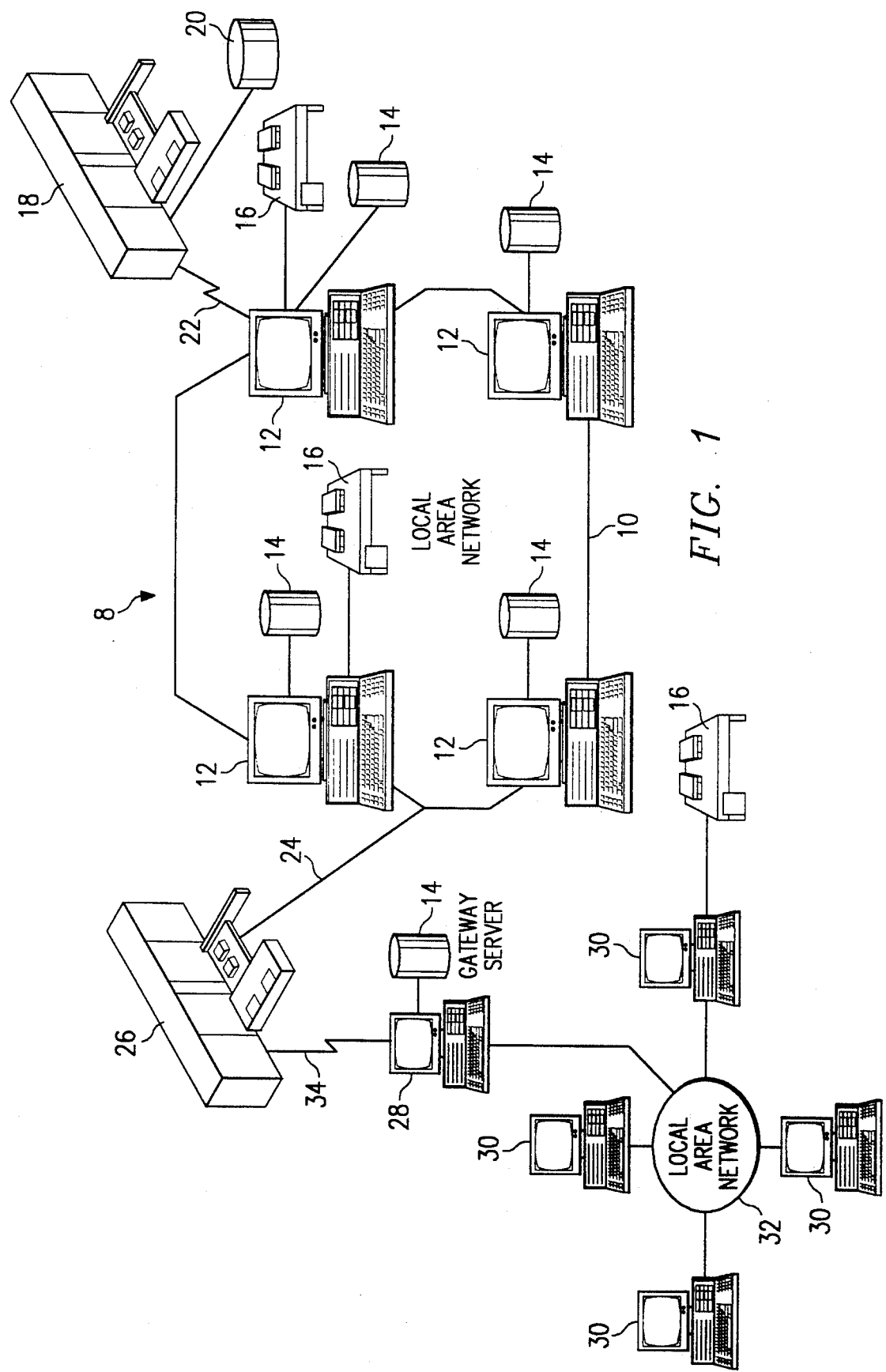
FIG. 1 is a schematic illustration of a data processing system in accordance with the present invention.

Referring to FIG. 1, there is depicted a graphical representation of a data processing system 8, which may be utilized to implement the present invention. As may be seen, data processing system 8 may include a plurality of networks, such as local area networks (LAN) 10 and 32, each of which preferably includes a plurality of individual computers 12 and 30, respectively. Of course, those skilled in the art will appreciate that a plurality of intelligent workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager while library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California, while LAN 10 may be located within Texan, and mainframe computer 18 may be located in New York.

Figure 2:
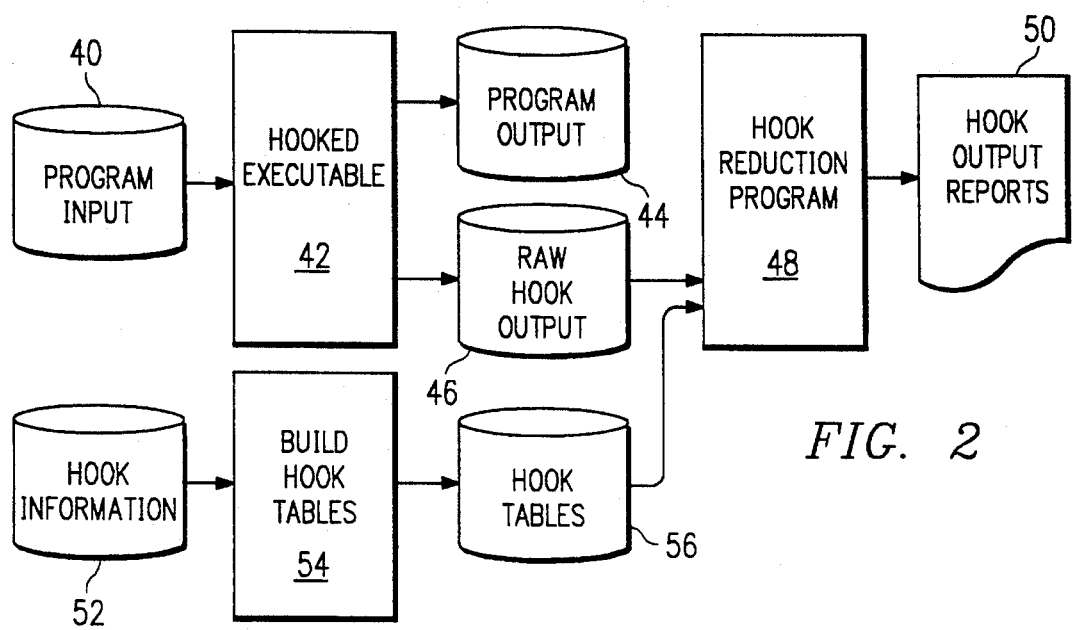
FIG. 2 is a schematic illustration of the running of a hooked executable program.

Referring to FIG. 2, a graphical illustration of the running of a hooked executable program, as is known, is shown. Program input 40 is provided to a hooked executable which is indicated by reference numeral 42. The hooked executable 42 comprises a program which has had hooks inserted thereto by any appropriate method.

After the hooked executable 42 is run, program output 44 and raw hook output 46 are produced. A hook reduction program 48 uses the raw hook output to produce hook output reports 50 based upon hook information 52. Hook information 52 may comprise, for example, a naming scheme (dependent upon the programming language), an unhooked name, a hooked name, a hook identifier, and other hook information such as is dependent upon the type of hook being used. Hook information 52 is used to build hook tables as identified by reference numerals 54 and 56. The hook tables 56 are provided to the hook reduction program 48.

In the prior art, the addition of hooks to program code can be a difficult and time-consuming project. For example, the greatly abbreviated sample source code (a C-language function) listed below will be used to describe the prior art procedure for the addition of hooks.

```
int aaa(int a, double b, char c)
{
    --- program statements ---
    return(a + (int)(b * pi) * r);
    --- program statements ---
    return(bbb(c, a/2));
    --- program statements ---
    return(0);
    --- program statements ---
    return(a/2 + (int)(b * pi) * r - (pi * pi));
}
```

Between the brackets, obviously, would be additional lines of the function code which have been omitted for the sake of simplicity. As can be seen, there are four different exit points in this example. At these points, the program will be exited and the value within parenthesis will be calculated and provided. Inserting hooks into the above source code would require the insertion of a new variable declaration, hook entries, hook exits, and the rewriting of return statements a follows:

```
int aaa(int a, double b, char c)
{
    int RC;
    HookEntry( ... );
    --- program statements ---
    RC = a + (int)(b * pi) * r;
    HookExit( ... );
    return(RC);
    --- program statements ---
    RC = bbb(c, a/2);
    HookExit( ... );
    return(RC);
    --- program statements ---
    HookExit( ... );
    return(0);
    --- program statements ---
    RC = a/2 + (int)(b * pi) * r - (pi * pi);
    HookExit( ... );
    return(RC);
}
```

The code must be edited to declare RC as a variable (i.e., "int RC"). A hook entry must be added for each entry point in the function. A hook exit must be added for each return statement. Depending upon the calculations in the return statement, the return statement may have to be rewritten as shown. If a return statement is missed, hook data will not be obtained on that statement and the remaining statements may return erroneous values or data that is subject to misinterpretation. As can be seen from the above example, the prior art manual method of adding hooks to code can be a difficult and time-consuming task. This is especially true in cases where there are many thousands of lines of code with multiple exits and entries throughout.

In contrast, the present invention provides a method which can be automated to add hooks to code. Continuing the example shown above, the following illustrates the simple actions required by the present invention to insert hooks:

```
int aaaHook(int a, double b, char c)
{
    --- program statements ---
    return(a + (int)(b * pi) * r);
    --- program statements ---
    return(bbb( c, a/2));
    --- program statements ---
    return(0);
    --- program statements ---
    return(a/2 + (int)(b * pi) * r - (pi * pi));
}
int aaa(int a, double b, char c)
{
    int RC;
    HookEntry( ... );
    RC = aaaHook(a, b, c);
    HookExit( ... );
    return(RC);
}
```

As can be seen, it is only necessary to rename the original function and write a short new function with the same name as the original function.

Figure 3:
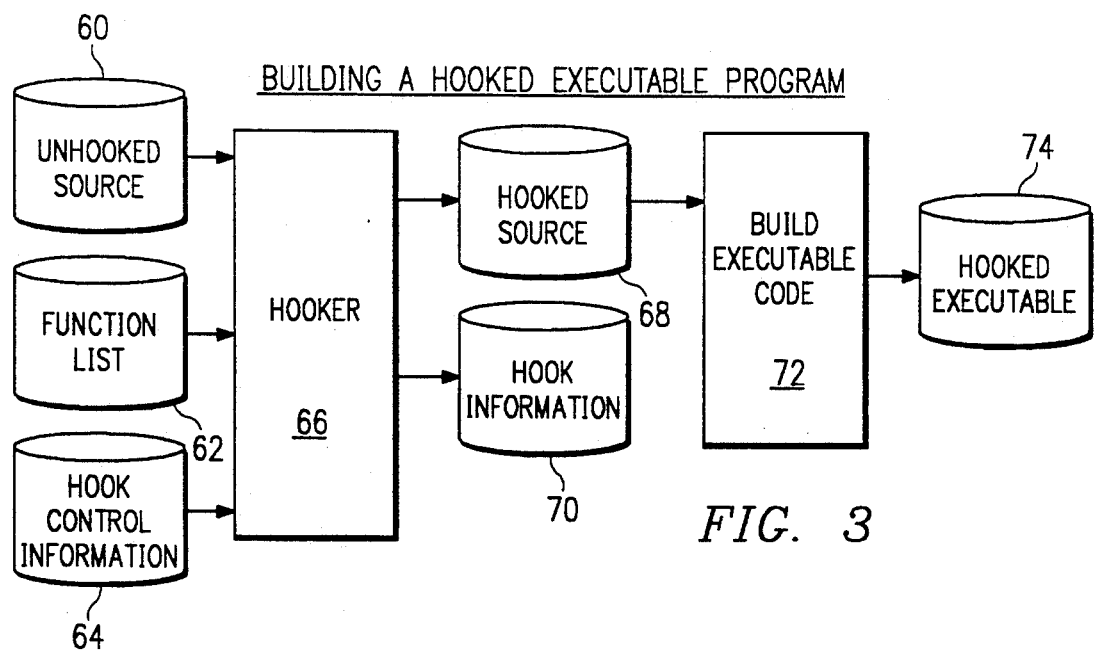
FIG. 3 is a schematic illustration of the building of a hooked executable program in accordance with the present invention.

Referring to FIG. 3, a graphical illustration of the building of a hooked executable program in accordance with the present invention is shown. The programmer obtains a copy of unhooked source as indicated by reference numeral 60. The programmer (or any other appropriate person) selects the functions (or methods, procedures, CSECTs, subroutines, etc.) that need to be hooked and forms a list thereof as indicated by reference numeral 62. Such functions can be indicated using full names, wild-card (global) characters, all functions in a program, all functions in a file, all functions referenced within a function, or all methods for a class or subclass. In addition, hook control information as indicated by reference numeral 64, such as previously described above, is obtained for use by the programmer. At Hooker 66, the programmer then renames the function to be hooked and writes a new hooking function with the same name as the original function, as will be subsequently described in greater detail. As a result of the steps at Hooker 66, a hooked source/program is produced at 68 along with hook information at 70 (i.e., the hook information 52 shown in FIG. 2). Executable code is then built as identified by reference numeral 72 which produces a hooked executable 74. The hooked executable 74 then fits into FIG. 2 as previously described above for the running thereof.

Figure 4:
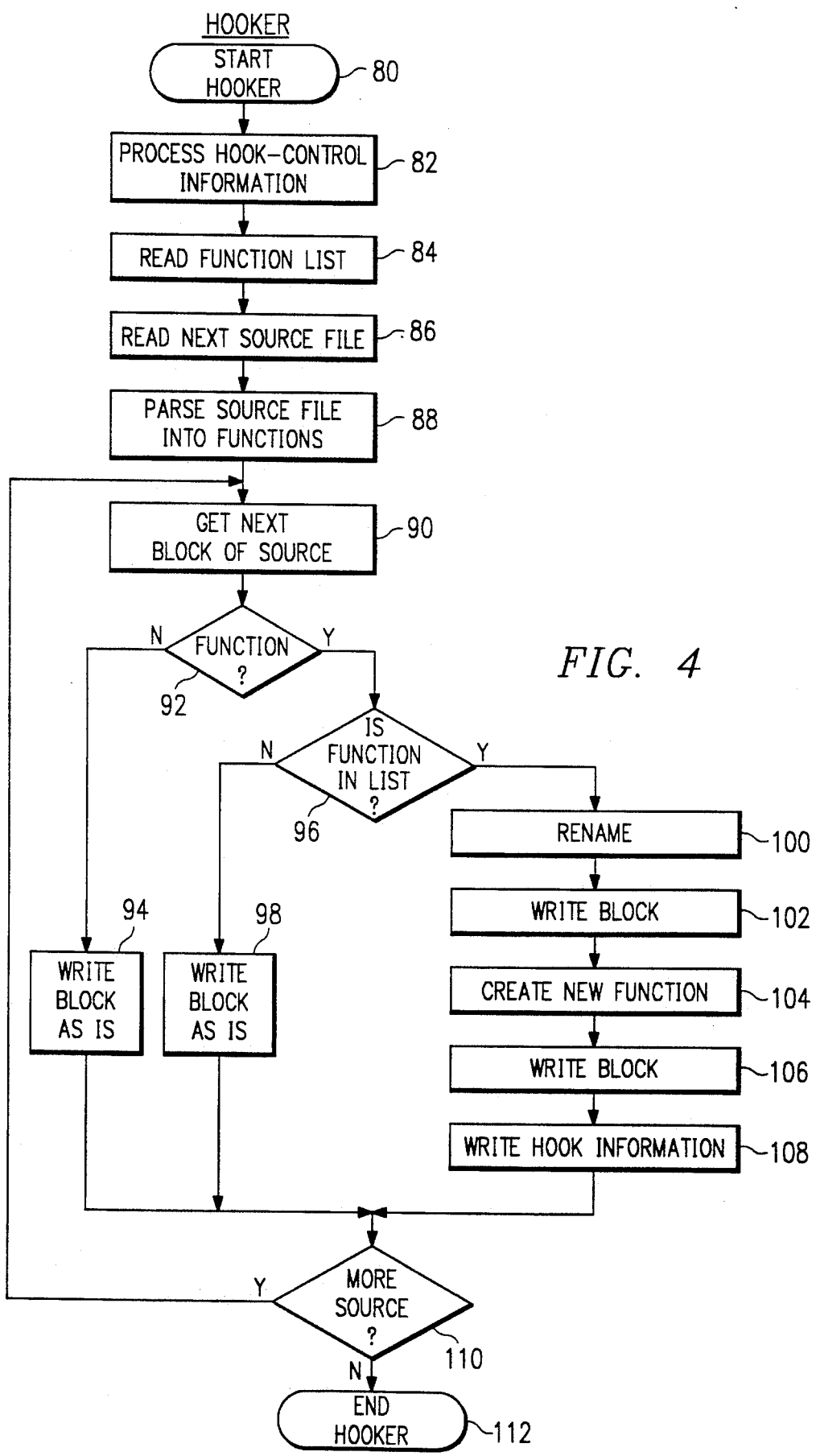
FIG. 4 is a flowchart illustrating the use of the present invention.

Referring next to FIGS. 4 and 5, a flowchart of the present invention is illustrated. The present invention starts at 80 and hook control information is processed at block 82. At block 84, the function list is read. At block 86, the next source file is read. The source file is parsed into functions at block 88 followed by getting a next block of source at block 90. It is then determined at decision block 92, whether or not the block of source is a function. If the response to decision block 92 is no, the block of source is written as is at block 94. If the response to decision block 92 is yes, it is determined at decision block 96 whether or not the function is on the function list which was previously read at block 84. If the response to decision block 96 is no, the block of source is written as is at block 98. If the response to decision block 96 is yes, the function is renamed at block 100 followed by writing the block at 102. A new function is created at block 104 (see FIG. 5) followed by writing of the block at 106. Hook information is then written at block 108. Subsequent to block 94, block 98, or block 108, it is determined at decision block 110 whether or not there is more source code to be checked. If the response to decision block 110 is yes, the present invention returns to block 90 to get the next block of source. If the response to decision block 108 is no, the present invention ends at 112.

Referring to FIG. 5, the 'Create New Function' block 104 of FIG. 4 is described in greater detail. At block 120, the original function name is copied. At block 112, the original function parameters and their declarations are copied. It is then determined at decision block 124 whether or not the function returns a value. If the response to decision block 124 is yes, a variable "RC" that will contain the return value is declared at block 126. If the response to decision block 124 is no, or subsequent to block 126, a hook entry call is built using hook control information and generated information at block 128. It is then determined at decision block 130 whether or not the function returns a value. If the response to decision block 130 is yes, a statement that sets the variable "RC" to the value returned by the renamed function is built at block 132. If the response to decision block 130 is no, a statement that executes the renamed function is built at block 134. Subsequent to block 132 or 134, a hook-exit call is built at block 136. It is then determined at decision block 138 whether or not the function returns a value. If the response to decision block 138 is no, a "Return" is built at block 140. If the response to decision block 138 is yes, a statement that returns the value "RC" is built at block 142. Subsequent to block 140 or block 142, the present invention proceeds to block 106 in FIG. 4, as previously described above.

In summary, the present invention provides a method for automated addition of hooks to software. By the simple steps of renaming the function to be hooked and writing a new function having the original function name, slow and error prone manual techniques of the prior art are avoided. Due to the simplicity of the present invention, it is no longer a requirement for a programmer to add the hooks.

Although the present invention has been particularly shown and described with reference to a preferred embodiment, it will be understood by those skilled in the art that various changes in form and detail may be made without departing from the spirit and the scope of the invention.

What is claimed is:

1. An improved computer implemented method of adding hooks to a computer program in order to capture data created as a result of running the program for subsequent review by an evaluator, comprising the steps of:
   automatically parsing a source file into functions;
   automatically comparing said parsed functions with a previously determined list of to be hooked functions:
   automatically renaming said parsed function if on said list from a first naming statement to a second naming statement;
   automatically writing said renamed function;
   automatically writing a hooking function to hook said renamed function, said hooking function comprising at least:
      a function statement comprising said first naming statement,
      a statement to call said renamed function, and
      a statement to exit said renamed function and return data; and
   automatically inserting into the program said hooking function after said renamed function, wherein upon running the program said hooking function automatically hooks said renamed function in order to capture the data for subsequent review.

2. A computer implemented method of capturing data generated by a computer running a computer program thereon for evaluation by an evaluator, comprising the steps of:
   loading a list of predetermined functions of the program which require data evaluation into the computer;
   automatically renaming each of said predetermined functions from a first naming statement to a second naming statement;
   automatically writing subsequent to each of said renamed functions a hooking function to hook each of said renamed functions, said hooking function comprising at least:
      a function statement comprising said first naming statement,
      a statement to call said renamed function, and
      a statement to exit said renamed function and return data; and
   capturing for display and evaluation by the evaluator the data generated by the computer upon running the program containing said renamed functions and said hooking functions.

* * * * *